US012090764B2

(12) United States Patent
Oki et al.

(10) Patent No.: US 12,090,764 B2
(45) Date of Patent: Sep. 17, 2024

(54) PRINTING APPARATUS AND CONTROL METHOD OF THE SAME

(71) Applicant: CANON KABUSHIKI KAISHA, Tokyo (JP)

(72) Inventors: Mitsuo Oki, Kanagawa (JP); Kazunari Shishido, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 183 days.

(21) Appl. No.: 17/840,749

(22) Filed: Jun. 15, 2022

(65) Prior Publication Data

US 2022/0410581 A1 Dec. 29, 2022

(30) Foreign Application Priority Data

Jun. 25, 2021 (JP) ................................ 2021-105979

(51) Int. Cl.
*B41J 2/175* (2006.01)

(52) U.S. Cl.
CPC ....... *B41J 2/17546* (2013.01); *B41J 2/17523* (2013.01)

(58) Field of Classification Search
CPC ..... B41J 2/17546; B41J 2/17523; B41J 29/38
USPC ........................................................ 347/12
See application file for complete search history.

(56) References Cited

U.S. PATENT DOCUMENTS

2020/0094568 A1* 3/2020 Koganehira ......... B41J 2/17503
2021/0302872 A1* 9/2021 Suzuki ................. G03G 15/553

FOREIGN PATENT DOCUMENTS

JP 2004-151931 A 5/2004
JP 2007-323015 A 12/2007

* cited by examiner

*Primary Examiner* — Jason S Uhlenhake
*Assistant Examiner* — Alexander D Shenderov
(74) *Attorney, Agent, or Firm* — Venable LLP

(57) ABSTRACT

A printing apparatus includes a printing unit to print using a first consumable or a second consumable and a printing control unit to control the printing unit. The printing unit is controlled to use the second consumable if the printing apparatus is in a contracted state, and decides, based on information at the time of attachment of the second consumable to the printing apparatus, whether to control the printing unit using the second consumable if the printing apparatus is in an uncontracted state. The information includes date and time of attachment of the second consumable to the printing apparatus and an identifier of the second consumable. In the uncontracted state, if the information indicates the second consumable has been attached to the printing apparatus during the contracted state, the printing unit is controlled using the second consumable, and otherwise the driving control is suppressed.

9 Claims, 9 Drawing Sheets

| CONTRACTED STATE / TYPE OF TANK | UNCONTRACTED STATE | CONTRACTED STATE |
|---|---|---|
| FIRST TANK | USABLE | USABLE |
| SECOND TANK | UNUSABLE | USABLE |

| CONTRACTED STATE / TYPE OF TANK | UNCONTRACTED STATE | CONTRACTED STATE |
|---|---|---|
| FIRST TANK | USABLE | UNUSABLE |
| SECOND TANK | UNUSABLE | USABLE |

FIG. 7

IN CHRONOLOGICAL ORDER ↓

| CONSUMABLE ATTACHMENT DATE AND TIME | PRINTER ID | INK ID |
| --- | --- | --- |
| YYYY/MM/DD/ hh/mm/ss | 0001 | 0000000A |
| YYYY/MM/DD/ hh/mm/ss | 0001 | 0000000N |
| YYYY/MM/DD/ hh/mm/ss | 0001 | 0000000K |
| YYYY/MM/DD/ hh/mm/ss | 0001 | 0000000D |
| YYYY/MM/DD/ hh/mm/ss | 0001 | 0000000F |

PRINTING APPARATUS AND CONTROL METHOD OF THE SAME

BACKGROUND OF THE INVENTION

Field of the Invention

The present invention mainly relates to a printing apparatus.

Description of the Related Art

Some contract models of a printing apparatus adopt a flat-rate accounting mode. Each of Japanese Patent Laid-Open No. 2007-323015 and Japanese Patent Laid-Open No. 2004-151931 discloses that the appropriate replacement time of a consumable is determined based on information specifying the consumable.

In the above-described model, consumables such as ink and toner may remain after the completion of the contract period (in an uncontracted state), and the remaining consumables may be discarded without being used up. In this point of view, the arrangements of Japanese Patent Laid-Open No. 2007-323015 and Japanese Patent Laid-Open No. 2004-151931 have room for improvement.

SUMMARY OF THE INVENTION

The present invention has been made in consideration of the above problem by the inventor, and prevents unnecessary discard of a consumable in a printing apparatus.

One of the aspects of the present invention provides a printing apparatus configured to be capable of attachment/detachment of a first consumable usable in an uncontracted state in which a predetermined contract has not been signed, and a second consumable different from the first consumable, comprising a printing unit configured to execute printing using one of the first consumable and the second consumable, and a printing control unit configured to execute driving control of the printing unit, wherein when the second consumable is attached to the printing apparatus, the printing control unit performs driving control of the printing unit using the second consumable if the printing apparatus is in a contracted state in which the predetermined contract has been signed, and decides, based on information at the time of attachment of the second consumable to the printing apparatus, whether to perform the driving control of the printing unit using the second consumable if the printing apparatus is in the uncontracted state.

Further features of the present invention will become apparent from the following description of exemplary embodiments (with reference to the attached drawings).

BRIEF DESCRIPTION OF THE DRAWINGS

FIG. 7 is a table showing a combination of the attachment date and time, the printer ID, and the ink ID held in a nonvolatile memory;

DESCRIPTION OF THE EMBODIMENTS

Figure 1:
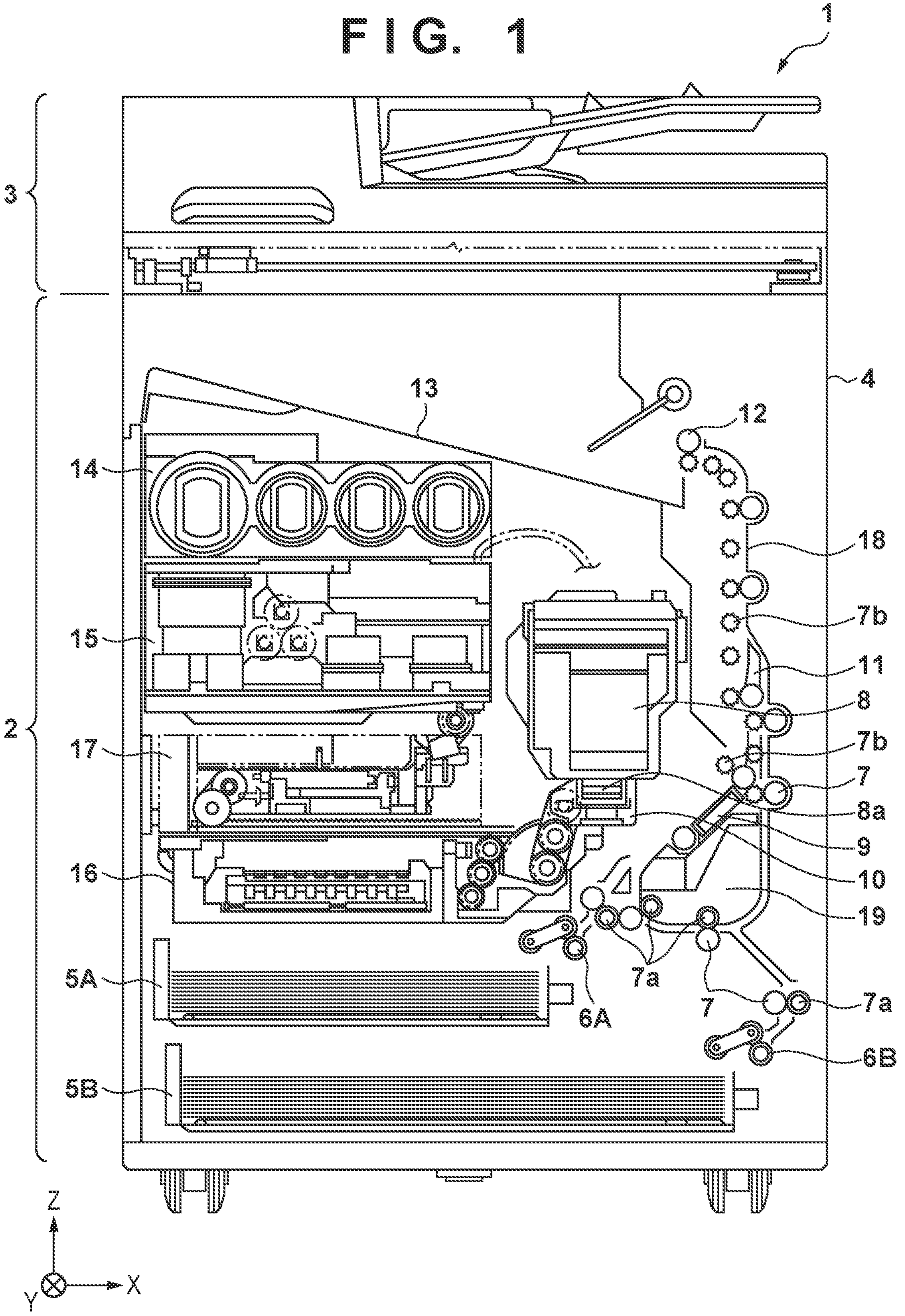
FIG. 1 is a schematic sectional view showing an example of the internal structure of a printing apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(Arrangement of Apparatus)

FIG. 1 is a schematic sectional view showing an example of the internal structure of a printing apparatus 1 used in an embodiment. The X direction indicates a horizontal direction viewing the apparatus from the front. The Y direction indicates a horizontal direction viewing the apparatus from the side, which corresponds to the array direction of discharge ports in a printing head 8 to be described later. The Z direction indicates a vertical direction viewing the apparatus in a planar view.

In this embodiment, the printing apparatus 1 is an inkjet printer capable of executing printing on a predetermined print medium using an inkjet printing method. Further, the printing apparatus 1 is a multi-function peripheral that includes a print unit (printing unit) 2 and a scanner unit 3. Although the details will be described later, the print unit 2 executes printing, using a printhead 8, on a print medium conveyed by a conveyance mechanism (conveyance rollers 7 and the like) to be described later. The scanner unit 3 includes an ADF (automatic document feeder) and an FBS (flatbed scanner). The scanner unit 3 reads an original automatically fed by the ADF, and reads (scans) an original placed on a document table of the FBS by a user.

The printing apparatus 1 individually controls driving of the printing unit 2 and driving of the scanner unit 3 to enable execution of a printing operation, a reading operation, and/or operations related thereto, but the scanner unit 3 may be omitted as another embodiment.

The print unit 2 includes a housing 4, a first cassette 5A, a second cassette 5B, a first feeding unit 6A, and a second feeding unit 6B. The housing 4 incorporates respective elements that can implement the function of the print unit 2. The first cassette 5A and the second cassette 5B for storing print media (cut sheets in this embodiment) are installed in the bottom portion of the housing 4 such that they can be detached/pulled out. Relatively small print media (for example, A4 size or the like) are stacked flat in the first cassette 5A, and relatively large print media (for example, A3 size or the like) are stacked flat in the second cassette 5B. The first feeding unit 6A is provided near the first cassette 5A so as to be capable of separating and feeding the print media one by one. Similarly, the second feeding unit 6B is provided near the second cassette 5B. When a printing operation is executed, the print medium is selectively fed from one of the cassettes 5A and 5B.

The print unit 2 further includes the conveyance rollers 7, a discharge roller 12, pinch rollers 7*a*, spurs 7*b*, a guide 18, an inner guide 19, and a flapper 11 as a conveyance mechanism for guiding the print medium in a predetermined direction. The conveyance rollers 7 are driving rollers arranged on the upstream side of the printhead 8 to be described later, and driven by a conveyance motor (not shown). The pinch rollers 7*a* are driven rollers that rotate while nipping the print medium together with the conveyance rollers 7. The discharge roller 12 is a driving roller arranged on the downstream side of the printhead 8 and driven by a conveyance motor (not shown). The spurs 7*b* clamp and convey the print medium together with the discharge roller 12. With the arrangement as described above, the print media are conveyed from the cassettes 5A and 5B to the printhead 8, and the printed print media are discharged to a discharge tray 13.

Note that in this specification, the "upstream side" and "downstream side" are used as representations indicating the relative positions in the conveyance path of the print medium by the conveyance mechanism. The upstream side corresponds to the side of the cassettes 5A and 5B. The downstream side corresponds to the side of the discharge tray 13.

The guide 18 is provided in the conveyance path so as to be capable of guiding the print medium in a predetermined direction. The inner guide 19 is a member extending in the Y direction, has a curved side surface, and guides the print medium along the side surface. The flapper 11 is a member for switching, by a pivot operation, the conveyance direction of the print medium when a double-sided printing operation is executed. The discharge tray 13 is a tray for stacking or holding the printed print medium discharged by the discharge roller 12.

The print unit 2 further includes the printhead 8, a platen 9, and a cap unit 10. The printhead 8 is a full-line color inkjet printhead. In a surface 8*a* on the printing side, a plurality of discharge ports for discharging ink based on print data are arrayed along the Y direction over a region corresponding to the width of the print medium. By discharging ink, characters, graphics, photographs, and the like are formed on the print medium, thereby implementing printing.

When the printhead 8 is waiting at a standby position, the discharge port surface 8*a* of the printhead 8 is capped by the cap unit 10 as shown in FIG. 1. On the other hand, when executing printing, a print controller 202 changes the direction of the printhead 8 such that the discharge port surface 8*a* faces the platen 9. The platen 9 is formed by a flat plate extending in the Y direction, and supports, from below, the print medium which is to undergo printing by the printhead 8.

The print unit 2 further includes an ink tank unit 14 and an ink supply unit 15. The ink tank unit 14 individually contains four color inks to be supplied to the printhead 8. The ink supply unit 15 is provided in a channel connecting the ink tank unit 14 and the printhead 8, and adjusts the pressure and the flow rate of ink in the printhead 8 so as to fall within appropriate ranges. This embodiment adopts a circulation type ink supply system, and the ink supply unit adjusts the pressure of the ink supplied to the printhead 8 and the flow rate of the ink collected from the printhead 8 so as to fall within appropriate ranges.

The print unit 2 further includes a maintenance unit 16 and a wiping unit 17. The maintenance unit 16 drives the cap unit 10 and the wiping unit 17 to execute a maintenance operation such as a recovery process on the printhead 8.

(Control System of Apparatus)

Figure 2:
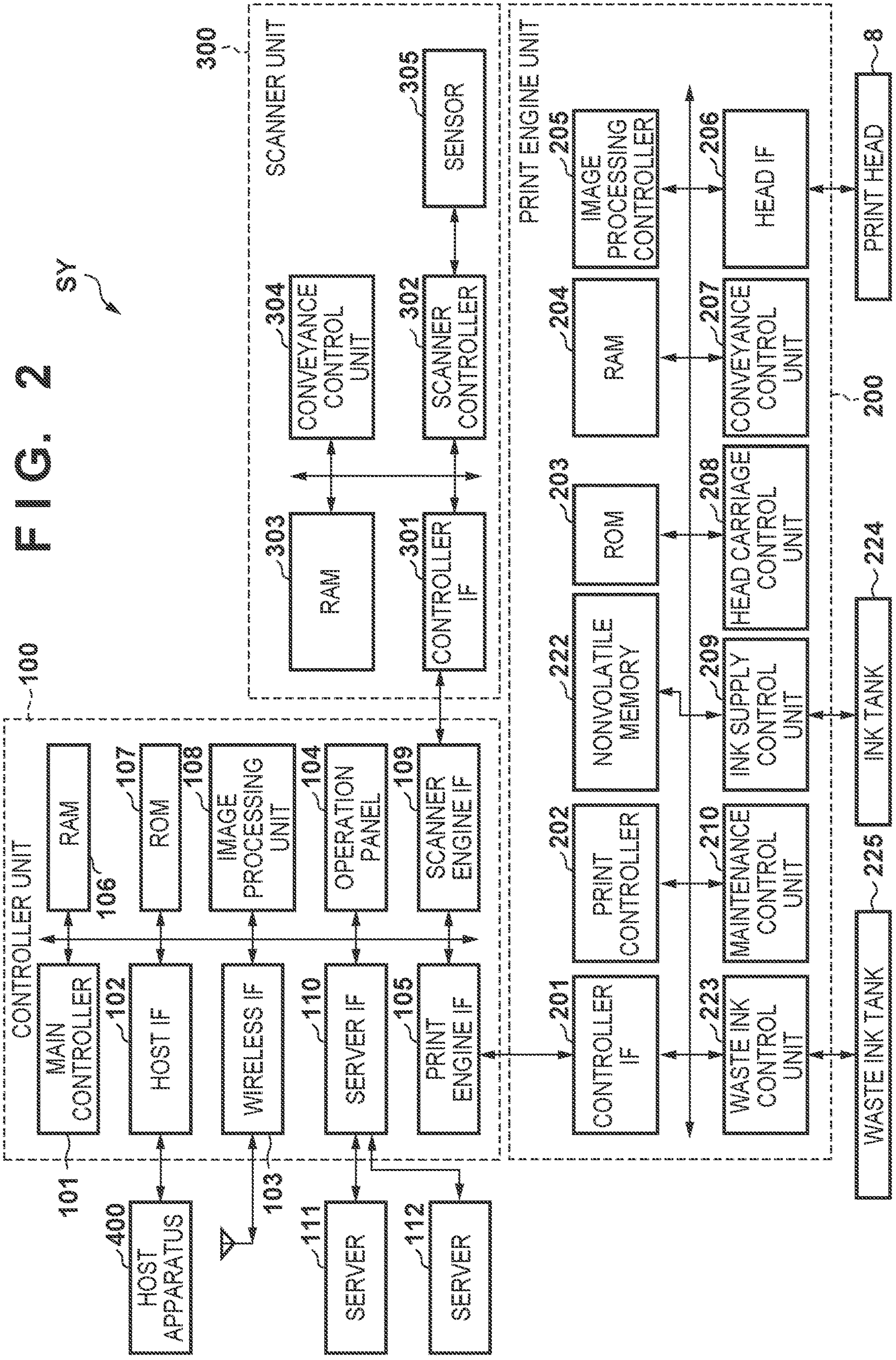
FIG. 2 is a block diagram showing an example of the configuration of a control system in the printing apparatus.

FIG. 2 is a block diagram showing an example of the configuration of a control system SY in the printing apparatus 1. The control system SY includes a print engine unit 200 that generally controls the print unit 2, a scanner engine unit 300 that generally controls the scanner unit 3, and a controller unit 100 that generally controls the overall printing apparatus 1.

The print engine unit 200 includes a controller I/F (interface) 201, the print controller 202, a ROM (Read Only Memory) 203, and a RAM (Random Access Memory) 204. The print engine unit 200 further includes an image processing controller 205, a head I/F 206, a conveyance control unit 207, a head carriage control unit 208, and an ink supply control unit 209. The print engine unit 200 further includes a maintenance control unit 210, a nonvolatile memory 222, and a waste ink control unit 223.

The scanner engine unit 300 includes a controller I/F 301, a scanner controller 302, a RAM 303, a conveyance control unit 304, and a sensor 305.

The controller unit 100 includes a main controller 101, a host I/F 102, a wireless I/F 103, an operation panel 104, a print engine I/F 105, a RAM 106, and a ROM 107. The controller unit 100 further includes an image processing unit 108, a scanner engine I/F 109, and a server I/F 110.

The print controller 202 controls the various kinds of mechanisms of the print engine unit 200 in accordance with an instruction from the main controller 101. The various kinds of mechanisms of the scanner engine unit 300 are controlled by the main controller 101.

In the controller unit 100, the main controller 101 formed by a CPU controls the overall printing apparatus 1 in accordance with programs and various kinds of parameters stored in the ROM 107 while using the RAM 106 as a work area. For example, when a print job is input from a host apparatus 400 via the host I/F 102 or the wireless I/F 103, image data received by the image processing unit 108 undergoes predetermined image processing in accordance with an instruction from the main controller 101. Then, the main controller 101 transmits the image data having undergone the image processing to the print engine unit 200 via the print engine I/F 105.

Note that the printing apparatus 1 may obtain image data from the host apparatus 400 via wireless communication or wired communication, or may obtain image data from an external storage device (USB memory or the like) connected to the printing apparatus 1.

A communication method used for wireless communication or wired communication is not limited. For example, as a communication method used for wireless communication, Wi-Fi (Wireless Fidelity)® or Bluetooth® is applicable. As a communication method used for wired communication, USB (Universal Serial Bus) or the like is applicable. For example, when a read command is input from the host apparatus 400, the main controller 101 transmits the read command to the scanner unit 3 via the scanner engine I/F 109.

The operation panel 104 is a mechanism for the user to execute an input/output operation for the printing apparatus 1. A touch panel display is typically used for the operation panel 104. The user can use the operation panel 104 to instruct an operation such as a copy or scan operation, set a printing mode, and recognize the information of the printing apparatus 1.

In the print engine unit 200, the print controller 202 formed by a CPU controls the various kinds of mechanisms included in the print unit 2 in accordance with programs and various kinds of parameters stored in the ROM 203 while using the RAM 204 as a work area. When various kinds of commands or image data are received via the controller I/F 201, the print controller 202 temporarily saves the received commands or data in the RAM 204. The print controller 202 causes the image processing controller 205 to convert the image data saved in the RAM 204 into print data that can be used by the printhead 8 upon executing printing. The print controller 202 transmits the converted print data to the printhead 8 via the head I/F 206, and causes the printhead 8 to execute printing based on the print data. At this time, the print controller 202 conveys the print medium by driving the feeding units 6A and 6B, the conveyance rollers 7, the discharge roller 12, and the flapper 11 via the conveyance control unit 207. With the arrangement as described above, in accordance with the instruction from the print controller 202, the printing operation by the printhead 8 is executed together with the conveyance operation of the print medium so that the printing process is performed.

The head carriage control unit 208 changes the direction and position of the printhead 8 in accordance with the operation state such as the maintenance state or the printing state of the printing apparatus 1. The ink supply control unit 209 controls the ink supply unit 15 such that the pressure of ink supplied to the printhead 8 falls within an appropriate range. The maintenance control unit 210 controls the operations of the cap unit 10 and the wiping unit 17 when a maintenance operation is executed on the printhead 8.

In the scanner engine unit 300, the main controller 101 controls the hardware resources of the scanner controller 302 in accordance with programs and various kinds of parameters stored in the ROM 107 while using the RAM 106 as a work area. Thus, the various kinds of mechanisms included in the scanner unit 3 are controlled. For example, when the main controller 101 controls the hardware resources in the scanner controller 302 via the controller I/F 301, an original loaded onto the ADF is conveyed via the conveyance control unit 304 and read by the sensor 305. Subsequently, the scanner controller 302 saves the read image data in the RAM 303.

Note that, as has been described above, the print controller 202 can convert image data into print data that can be used by the printhead 8 upon executing printing. Thus, the print controller 202 can cause the printhead 8 to execute a printing operation based on the image data read by the scanner controller 302.

All or some of the above-described units 100, 200, and 300 may be combined as a printing control unit. That is, the printing control unit can control the respective elements so as to implement all or some of the operations of the printing apparatus 1 described in the embodiment.

(Contract System According to Embodiment)

In this embodiment, the main controller 101 provides a flat-rate system that operates while switching between a subscription contract which grants a license for a predetermined period and a non-subscription contract (or simply a non-contract). That is, the printing apparatus 1 includes, as its state or mode, a contracted state (a state in which a predetermined contract has been signed) and an uncontracted state (a state in which the predetermined contract has not been signed), and driving control operations different between the contracted state and the uncontracted state are executed, the details of which will be described later.

Figure 3:
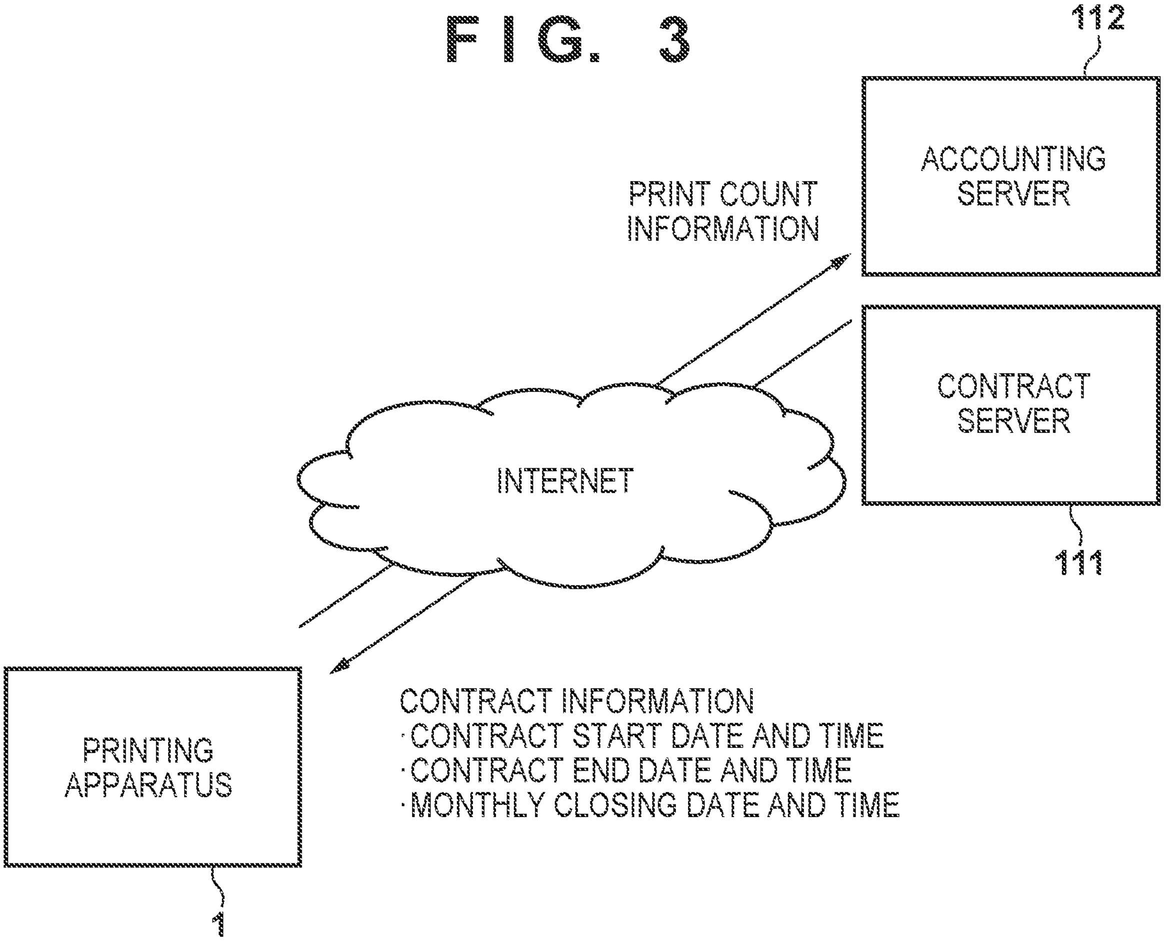
FIG. 3 is a schematic view showing a communication mode of the printing apparatus with a contract server and an accounting server.

FIG. 3 is a schematic view showing the communication mode of the printing apparatus 1 with a contract server 111 and an accounting server 112. The main controller 101 periodically receives contract information (for example, contract start date and time, contract end date and time, monthly closing date and time, and the like) from the contract server 111 via the server I/F 110, and stores the contract information in the nonvolatile memory 222. The main controller 101 periodically transmits print count information to the accounting server 112 via the server I/F 110. Note that the above-described communication method is used in the above-described communication, but another method may be adopted as the communication unit.

Figures 4A, 4B, 4C:
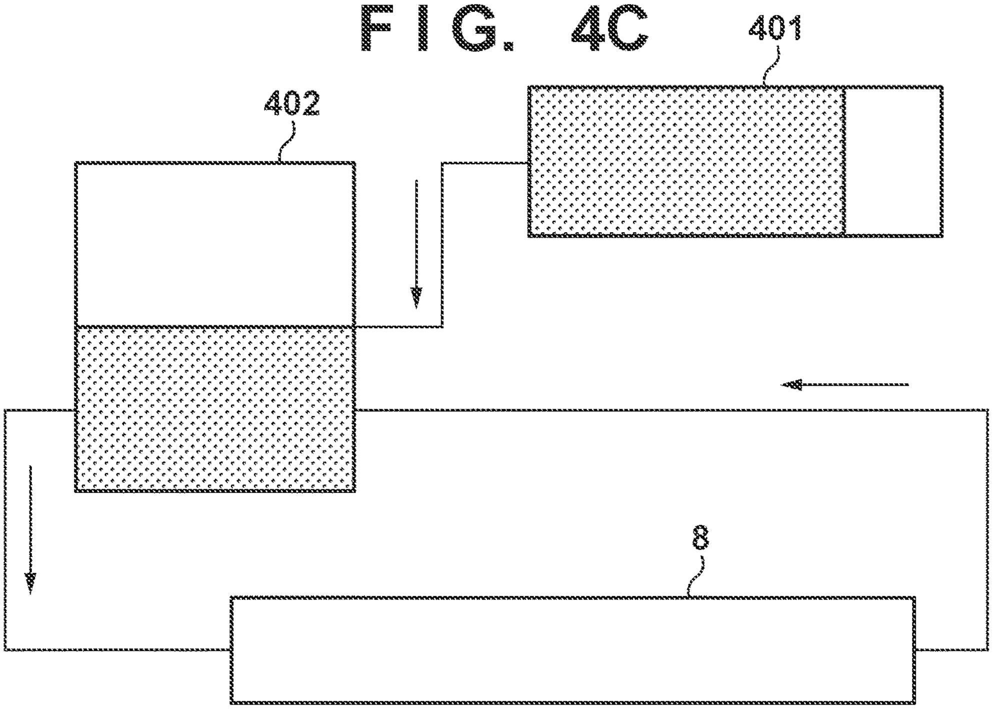
FIGS. 4A and 4B are tables each showing, for each kind, the propriety of use of an ink tank according to the state of the apparatus.
FIG. 4C is a schematic view showing the flow of ink supply.

FIG. 4A shows the type of an ink tank 224 connected to the ink supply control unit 209, and “usable” or “unusable” of the ink tank 224 according to the contract state. The printing apparatus 1 can be in one of a subscription uncontracted state (a state in which a contract has not been signed (first state)) and a contracted state (a contracted state (second state)) in which the subscription contract has been signed. The first tank (first consumable) can be used regardless of the uncontracted state or the contracted state. On the other hand, the second tank (second consumable) is usable only in the contracted state, and the second tank becomes unusable in the uncontracted state.

Here, the first tank can be referred to as a sales tank, a disposable tank, or the like, and the second tank can be referred to as a leasing tank, a recycling tank, or the like. The first tank and the second tank can be distinguished based on the unique information of the IC (integrated circuit) chip that can be provided in the tank itself, but may be distinguished by the type of tank, or may be distinguished by the attachment position on the printing apparatus 1.

Note that as another embodiment, the above-described combination of “usable” and “unusable” of the tanks may be configured as shown in FIG. 4B.

FIG. 4C is a schematic view showing the flow of ink supply. If the ink tank 224 attached to the apparatus main body is usable, the print controller 202 causes the printing material (ink) contained in a main tank 401 to flow to a sub tank 402 until the printing material in the sub tank 402 reaches a reference amount.

On the other hand, if the ink tank 224 attached to the apparatus main body is unusable, even when the printing material in the sub tank 402 does not meet a reference value, the flow of the printing material from the main tank 401 is suppressed by the print controller 202.

If the main controller 101 determines during a printing process that the ink tank 224 attached to the apparatus main body is unusable, it gives the print controller 202 a notification to stop the print job via the print engine I/F 105 and the controller I/F 201. When the notification is received, the print controller 202 causes the ink supply control unit 209 to stop the flow of the printing material from the sub tank 402 to the printhead 8, thereby terminating the print job.

Figure 5:
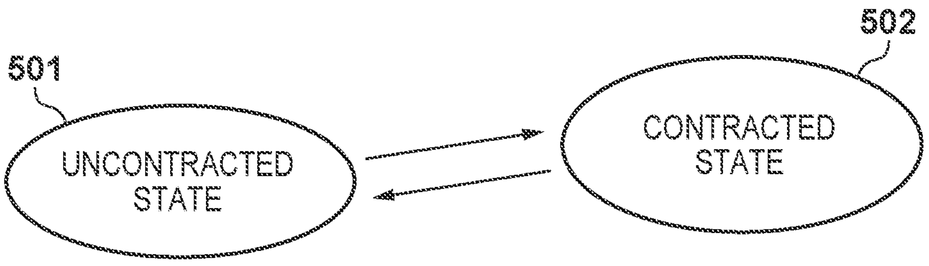
FIG. 5 is a state transition view of the printing apparatus.

FIG. 5 is a state transition view of the above-described flat-rate system (see FIG. 3) provided by the main controller 101. The initial state (typically, the state at factory shipment) of the flat-rate system is an uncontracted state 501. Based on the contract information obtained from the contract server 111, the flat-rate system causes transition of the state of the printing apparatus 1 from the uncontracted state 501 to a contracted state 502 or from the contracted state 502 to the uncontracted state 501.

Figure 6A:
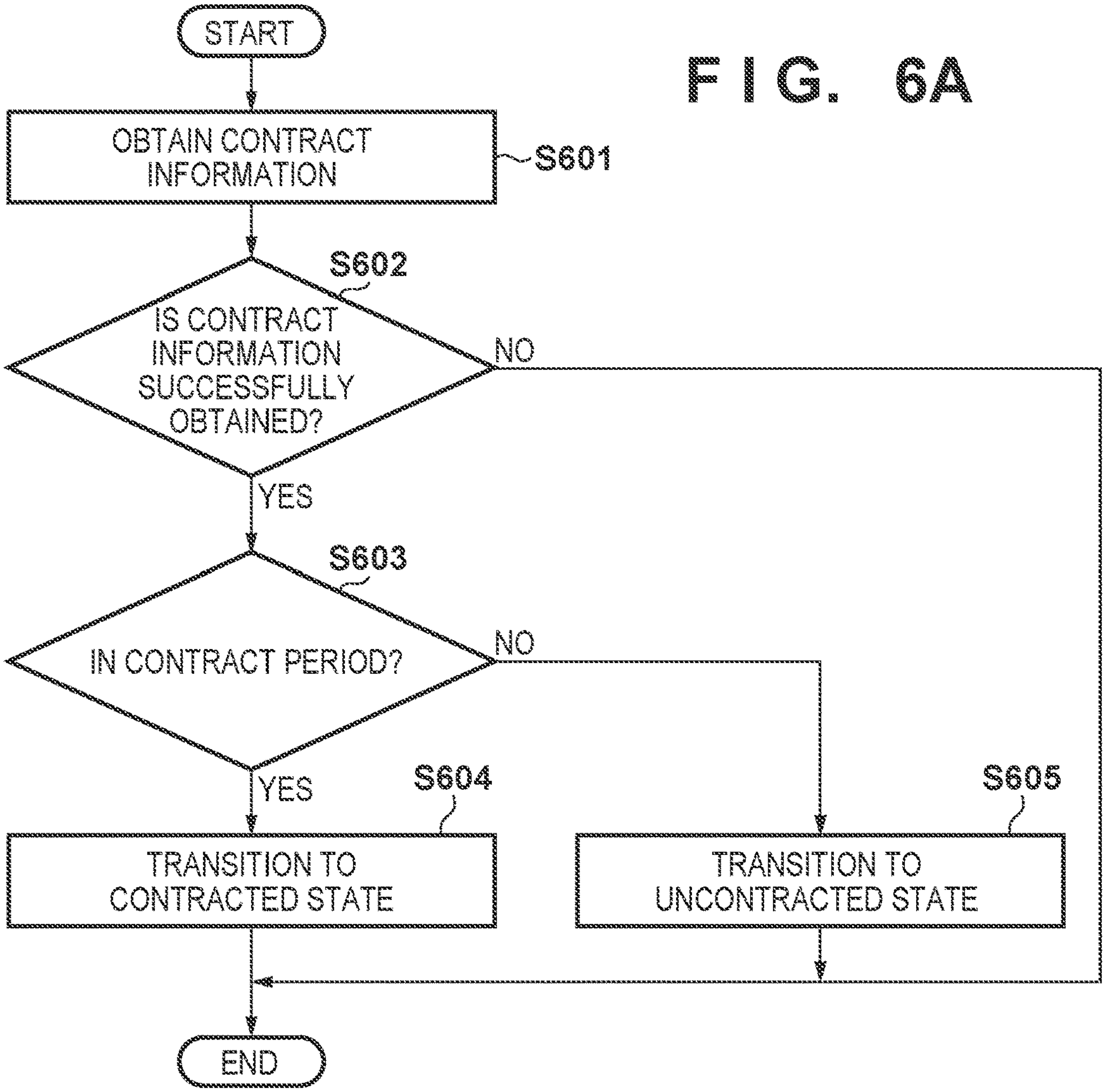
FIGS. 6A and 6B are flowcharts each illustrating a contract information obtainment process performed in a period from obtainment of contract information to state transition.

FIG. 6A is a flowchart illustrating a contract information obtainment process performed in a period from obtainment of the contract information to state transition. Note that the process illustrated in the flowchart of FIG. 6A is performed mainly by the main controller 101 at a predetermined period or in response to a user operation of the operation panel 104.

In step S601 (to be simply referred to as "S601" hereinafter, and the same applies to the other steps to be described later), the main controller 101 obtains contract information from the server 111.

In S602, the main controller 101 determines whether the contract information is successfully obtained. If the contract information is successfully obtained, the process advances to S603. On the other hand, if the contract information is not successfully obtained, this flowchart is terminated.

In S603, the main controller 101 determines whether it is in a contract period. In this embodiment, if the time of the determination is on or after the contract start date and time and before the contract end date and time, the process advances to S604; otherwise, the process advances to S605.

The state transitions to the contracted state in S604, or transitions to the uncontracted state in S605. After this, the flowchart is terminated. Note that when the state transitions in S604 or S605, the state information is stored in the nonvolatile memory 222.

Figure 6B:
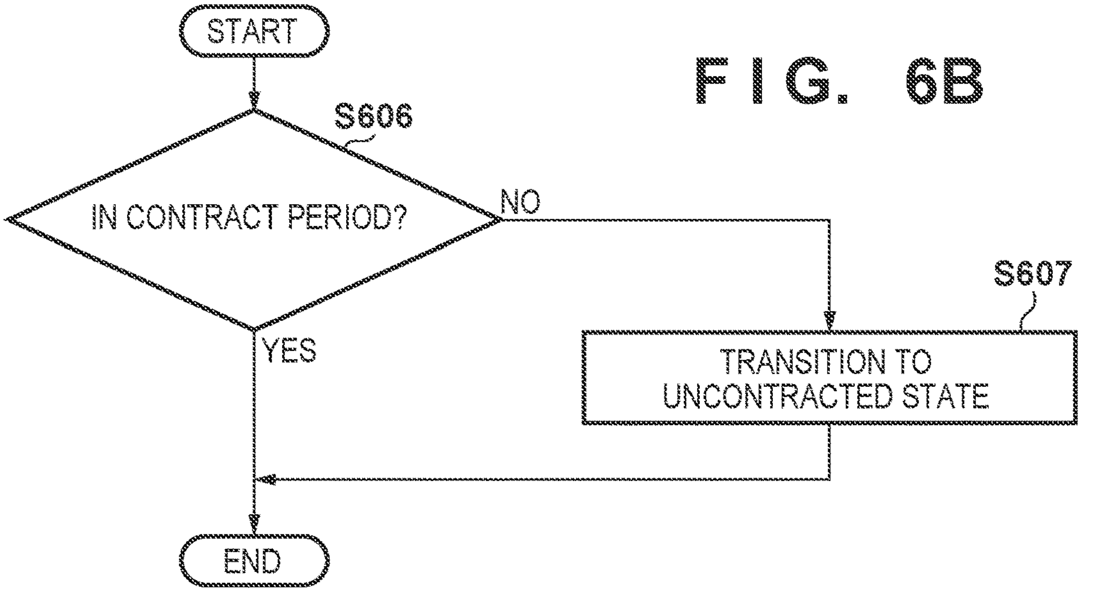

FIG. 6B is a flowchart illustrating the procedure of transition from the contracted state to the uncontracted state. Note that the process illustrated in the flowchart of FIG. 6B is periodically performed.

In S606, it is determined whether it is in the contract period. In this embodiment, if the time of the determination is on or after the contract start date and time and before the contract end date and time, this flowchart is terminated; otherwise, the process advances to S607, and the state information is stored in the nonvolatile memory 222.

FIG. 7 shows information (table) held in the nonvolatile memory 222 and indicating a combination of the consumable attachment date and time, the printer ID, and the ink ID. The consumable attachment date and time indicates the date and time of the attachment of the second tank. The printer ID indicates the ID (identifier) of the printing apparatus 1 to which the second tank has been attached. The ink ID indicates the ID of the second tank, and may be represented as the ink tank ID or simply the tank ID. Since the ink tank unit 14 is configured to contain respective four color inks, the table of FIG. 7 is held for each of the kinds of the mounted inks.

In this example, the ink tank unit 14 can contain inks of four colors (cyan, magenta, yellow, and black). Therefore, for each of the cyan tank, the magenta tank, the yellow tank, and the black tank, one combination is held in the nonvolatile memory 222.

Note that since the respective parts or elements are individually formed in the manufacturing process of the apparatus 1, the printer ID is held in this embodiment. However, holding of the printer ID may be omitted.

Figure 8:
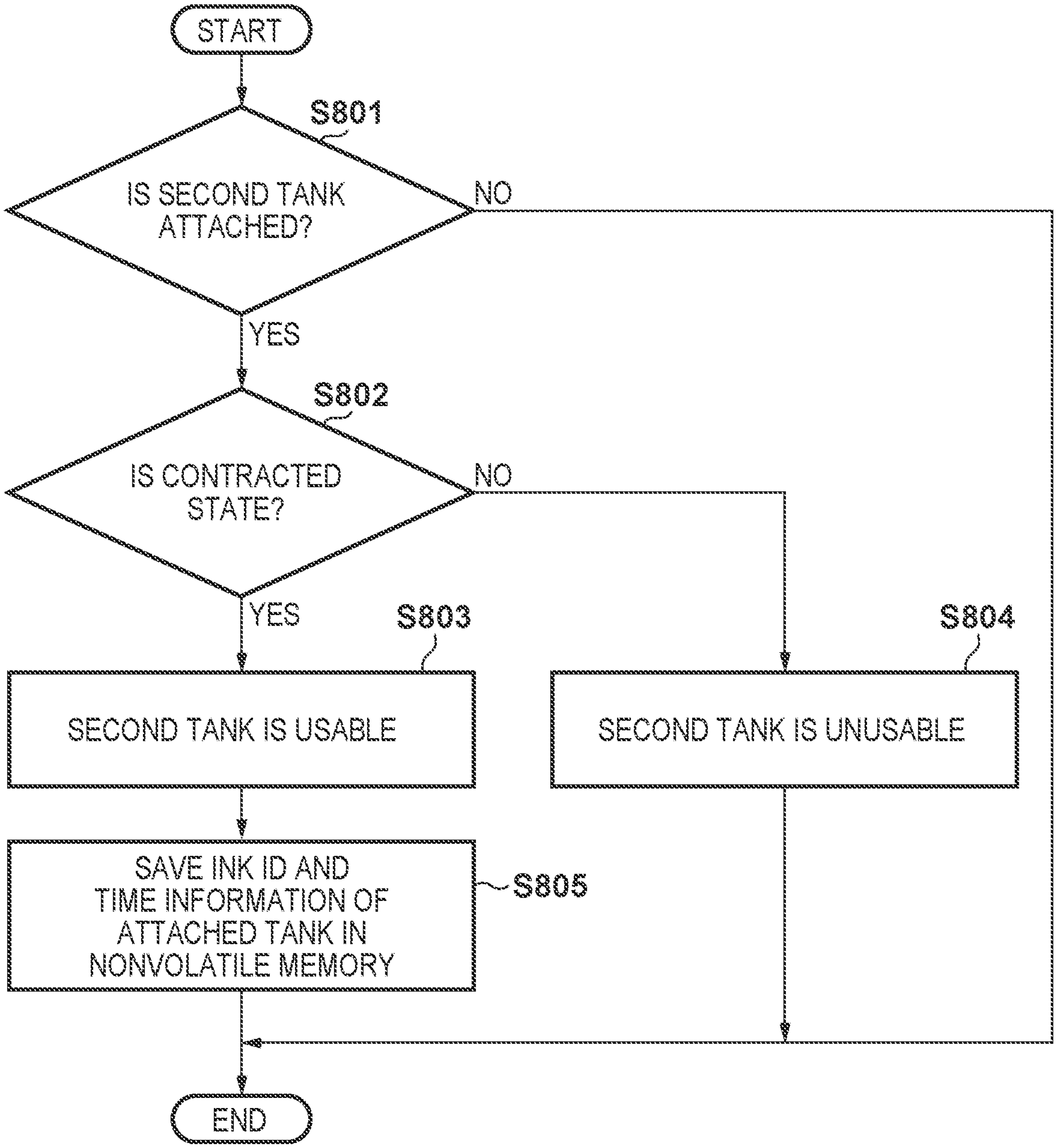
FIG. 8 is a flowchart illustrating control in the printing apparatus performed when an ink tank is attached.

FIG. 8 is a flowchart for determining whether the second tank attached to the apparatus main body can be used. Note that the process illustrated in the flowchart of FIG. 8 is performed by the main controller 101 when the ink tank 224 is replaced.

In S801, it is determined whether the second tank has been attached. If the second tank has been attached, the process advances to S802. If the second tank has not been attached, this flowchart is terminated.

In S802, it is determined whether the state is the contracted state. If the state is the contracted state, the process advances to S803; otherwise, the process advances to S804.

In S803, the second tank is set to be usable. Then, in S805, the ink ID and time information of the attached tank are held in the nonvolatile memory 222.

In S804, the second tank is set to be unusable.

Figure 9:
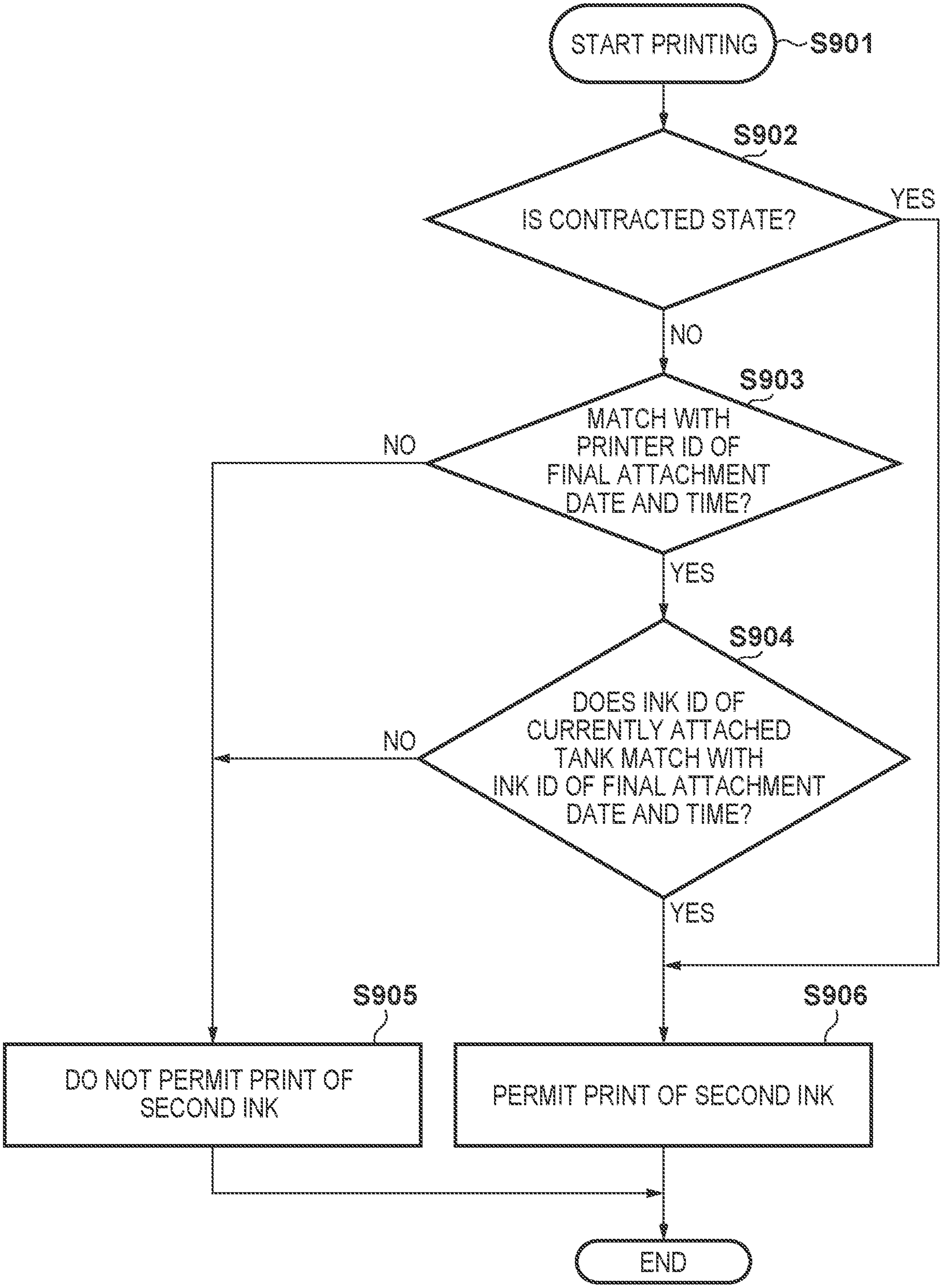
FIG. 9 is a flowchart illustrating control in the printing apparatus performed when printing is started.

FIG. 9 is a flowchart for determining whether the second tank can be used when printing is started. Note that the process illustrated in FIG. 9 is performed by the main controller 101 when printing is started.

After printing is started in S901, it is determined in S902 whether the state is the contracted state. If the state is the contracted state, the process advances to S906; otherwise, the process advances to S903.

In S903, referring to the table of the combination of the attachment date and time, the printer ID, and the ink ID shown in FIG. 7, it is determined, based on the printer ID, whether the second tank was attached to another printing apparatus during the contracted state. If the printer ID matches (if the second tank has been attached to the single printing apparatus 1 during the contracted state), the process advances to S904. On the other hand, if the printer ID does not match (if the second tank was attached to another printing apparatus during the contracted state), the process advances to S905.

Note that since holding of the printer ID may be omitted as has been described above, and the printer ID becomes the unique information of the apparatus 1 after the manufacture of the apparatus 1, S903 may be omitted.

In S904, it is determined whether the ink ID of the second tank currently attached to the apparatus 1 matches the ink ID held in the nonvolatile memory 222. If the ink ID matches, the process advances to S906. If the ink ID does not match, the process advances to S905.

In S905, it is decided not to permit printing using the second tank, and this flowchart is terminated.

In S906, it is decided to permit printing using the second tank, and this flowchart is terminated.

As has been described above, even when the contract ends, and the state becomes the uncontracted state, if the ink ID indicating the finally attached second tank in the contracted state matches the ink ID indicating the currently attached second tank in the uncontracted state, execution of printing is permitted. With this, on the customer side, even after the contract ends, the customer can execute printing so as to use up the printing material (remaining ink) remaining in the second tank. This can prevent unnecessary discarding of the remaining printing material.

According to the embodiment described above, when the ink tank 224 is attached as the second tank to the printing apparatus 1 in the contracted state, the information indicating the attachment date and time, the printer ID, and the ink ID is held in the nonvolatile memory 222 as, for example, the attachment information. In the uncontracted state after the contract is completed, based on the attachment information, it is decided whether to execute printing using the second tank. Thus, for example, if the second tank has been continuously attached to the printing apparatus 1 from the contracted state, printing using the second tank can be continuously executed. Therefore, it becomes possible to appropriately use up the printing material remaining in the second tank.

Note that in the above description, the ink tank 224 is taken as an example of the consumable, but the contents of the embodiment are also applicable to another consumable (for example, toner). The concept of "consumption"

includes "wearing", "degradation" and the like in addition to "exhaustion". The concept of "consumable" can include any element such as a member or a part that can be consumed by executing printing.

(Program)

The present invention can also be implemented by processing of supplying a program configured to implement one or more functions of the above-described embodiment to a system or apparatus via a network or a storage medium and reading out and executing the program by one or more processors in the computer of the system or the apparatus. For example, the present invention can also be implemented by a circuit (for example, ASIC) that implements the one or more functions.

(Others)

In the above description, the printing apparatus 1 using an inkjet printing method has been described as an example. However, the printing method is not limited to the above-described mode. Further, the printing apparatus 1 may be a single-function printer having only a printing function, or may be a multi-function printer having a plurality of functions such as a printing function, a FAX function, and a scanner function. In addition, the printing apparatus 1 may be a manufacturing apparatus for manufacturing, for example, a color filter, an electronic device, an optical device, a microstructure, or the like using a predetermined printing method.

The term "printing" in this specification should be interpreted in a broad sense. Accordingly, the mode of "printing" does not matter whether the object formed on a print medium is significant information such as characters and graphics, and also does not matter whether the object is visualized so that a human can visually perceive it.

Further, "print medium" should be interpreted in a broad sense, similar to "printing" described above. The concept of "print medium" can include, in addition to paper which is generally used, any member that can accept ink, such as cloth, a plastic film, a metal plate, glass, ceramics, a resin, wood, leather, and the like.

Furthermore, "ink" should be interpreted in a broad sense, similar to "printing" described above. Accordingly, the concept of "ink" can include, in addition to a liquid that forms an image, a figure, a pattern, or the like by being applied onto a print medium, additional liquids that can be used for processing a print medium, processing ink (for example, coagulation or insolubilization of colorants in ink applied onto a print medium), or the like. From this point of view, the printing apparatus 1 may be represented as a liquid discharge apparatus, and the printhead 8 may be represented as a liquid discharge head.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-105979, filed on Jun. 25, 2021, which is hereby incorporated by reference herein in its entirety.

What is claimed is:

1. A printing apparatus configured to be capable of attachment/detachment of a first consumable usable in an uncontracted state in which a predetermined contract has not been signed, and a second consumable different from the first consumable, comprising:

a printing unit comprising a memory containing instructions and a processor to execute the instructions to execute printing using one of the first consumable and the second consumable; and a printing control unit configured to execute driving control of the printing unit, wherein when the second consumable is attached to the printing apparatus, the instructions being executed to cause the printing control unit to perform driving control of the printing unit using the second consumable if the printing apparatus is in a contracted state in which the predetermined contract has been signed, and decide, based on information at the time of attachment of the second consumable to the printing apparatus, whether to perform the driving control of the printing unit using the second consumable if the printing apparatus is in the uncontracted state, wherein the information includes date and time of attachment of the second consumable to the printing apparatus, and an identifier of the second consumable, and in the uncontracted state, if the information indicates the second consumable has been attached to the printing apparatus during the contracted state, the instructions are further executed to perform driving control of the printing unit using the second consumable, and otherwise to suppress the driving control.

2. The apparatus according to claim 1, wherein when the first consumable is attached to the printing apparatus, the instructions are further executed to perform driving control of the printing unit using the first consumable regardless of the contracted state or the uncontracted state.

3. The apparatus according to claim 1, wherein the instructions are further executed to determine, based on unique information of a consumable attached to the printing apparatus, whether the consumable is the first consumable or the second consumable.

4. The apparatus according to claim 1, wherein the instructions are further executed to receive contract information indicating whether the printing apparatus is in the contracted state or the uncontracted state, wherein when the second consumable has been attached to the printing apparatus, the printing control unit refers to the contract information to decide whether to perform the driving control of the printing unit using the second consumable.

5. The apparatus according to claim 4, wherein the contract information is periodically received.

6. The apparatus according to claim 4, wherein when a job instructing to start printing is received, the printing control unit refers to the contract information to decide whether to perform the driving control of the printing unit using the second consumable.

7. The apparatus according to claim 1, wherein the printing apparatus is an inkjet printer, and each of the first consumable and the second consumable is an ink tank.

8. The apparatus according to claim 1, wherein driving control of the printing unit is control for printing an image on a print medium.

9. A control method of a printing apparatus including a contracted state and an uncontracted state, wherein the printing apparatus is configured to be capable of attachment/detachment of a first consumable usable in the uncontracted state and a second consumable different from the first consumable, and comprises a printing unit configured to execute printing using one of the first consumable and the second consumable, and the method comprises, when the second consumable is attached to the printing apparatus, performing driving control of the printing unit using the second consumable if the printing apparatus is in the contracted state; and deciding, based on information at the time of attachment of the second consumable to the printing apparatus, whether to perform the driving control of the printing unit using the second consumable if the printing apparatus is in the uncontracted state, wherein the information includes date and time of attachment of the second consumable to the printing apparatus, and an identifier of the second consumable, and in the uncontracted state, if the information indicates that the second consumable has been attached to the printing apparatus during the contracted state, performing driving control of the printing unit using the second consumable, and otherwise suppressing the driving control.

* * * * *